United States Patent [19]

Berg

[11] 4,357,031
[45] Nov. 2, 1982

[54] TOP MOUNTED LIFT RAM FOR TRACTOR

[75] Inventor: David A. Berg, Milwaukee, Wis.

[73] Assignee: Allis-Chalmers Corporation, Milwaukee, Wis.

[21] Appl. No.: 193,608

[22] Filed: Oct. 3, 1980

[51] Int. Cl.³ .................. A01B 63/111; B60D 1/14
[52] U.S. Cl. .................. 280/461 A; 172/439; 180/900; 280/460 A
[58] Field of Search .......... 280/456 A, 460 A, 461 A; 180/900; 172/439, 9

[56] References Cited

U.S. PATENT DOCUMENTS

| | | | |
|---|---|---|---|
| 3,023,818 | 3/1962 | Miller et al. | 172/439 |
| 3,048,981 | 8/1962 | Mark et al. | 172/9 |
| 3,136,371 | 6/1964 | Rau et al. | 172/439 |
| 3,708,017 | 1/1973 | Alexandrovsky et al. | 172/439 |
| 4,085,806 | 4/1978 | Osujyo | 172/9 |

Primary Examiner—Joseph F. Peters, Jr.
Assistant Examiner—Donn McGiehan
Attorney, Agent, or Firm—Arthur L. Nelson

[57] ABSTRACT

A top mounted lift hydraulic ram on a tractor for a three-point hitch mounted on a removable subassembly to facilitate assembly and convenience in servicing.

9 Claims, 6 Drawing Figures

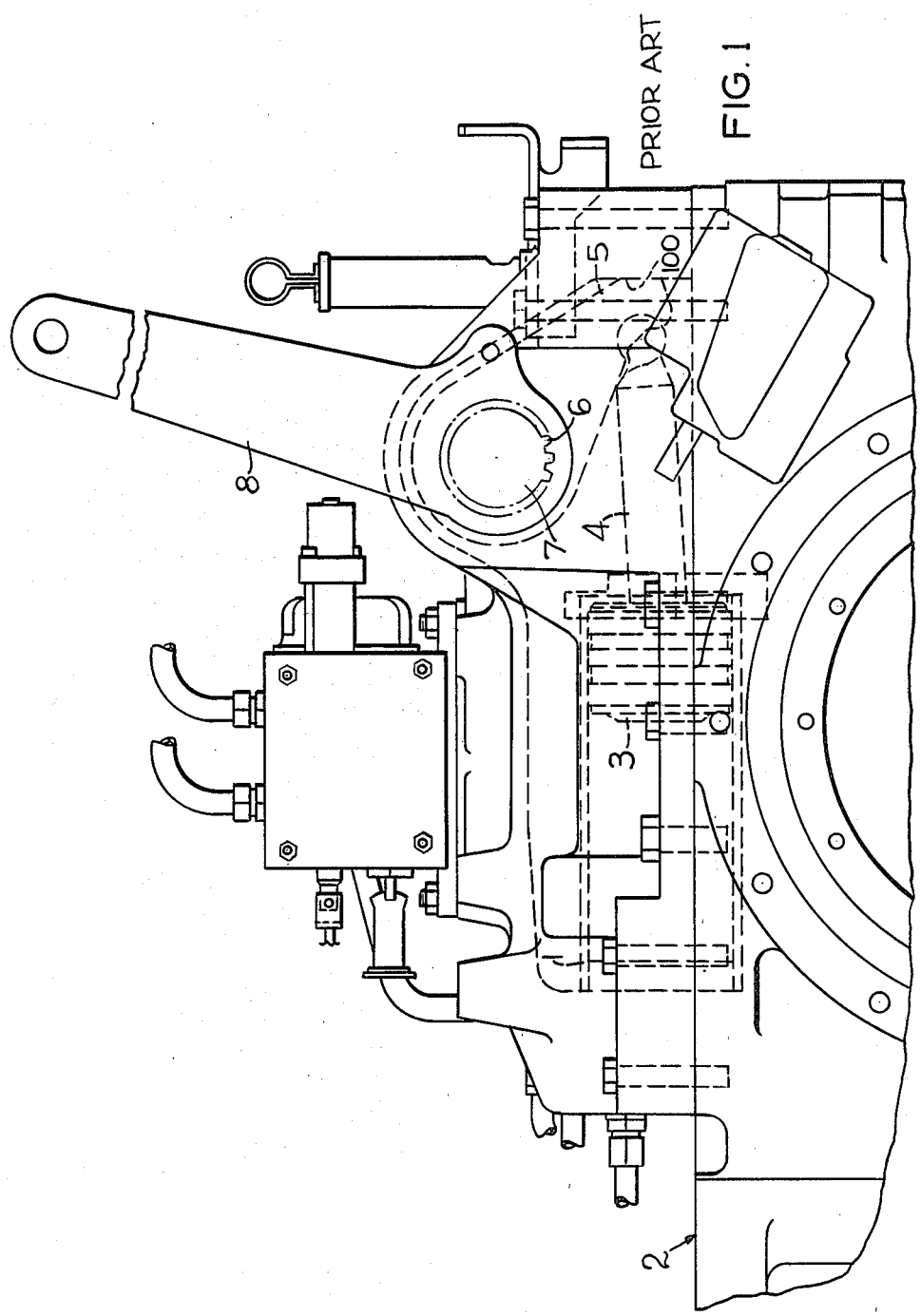

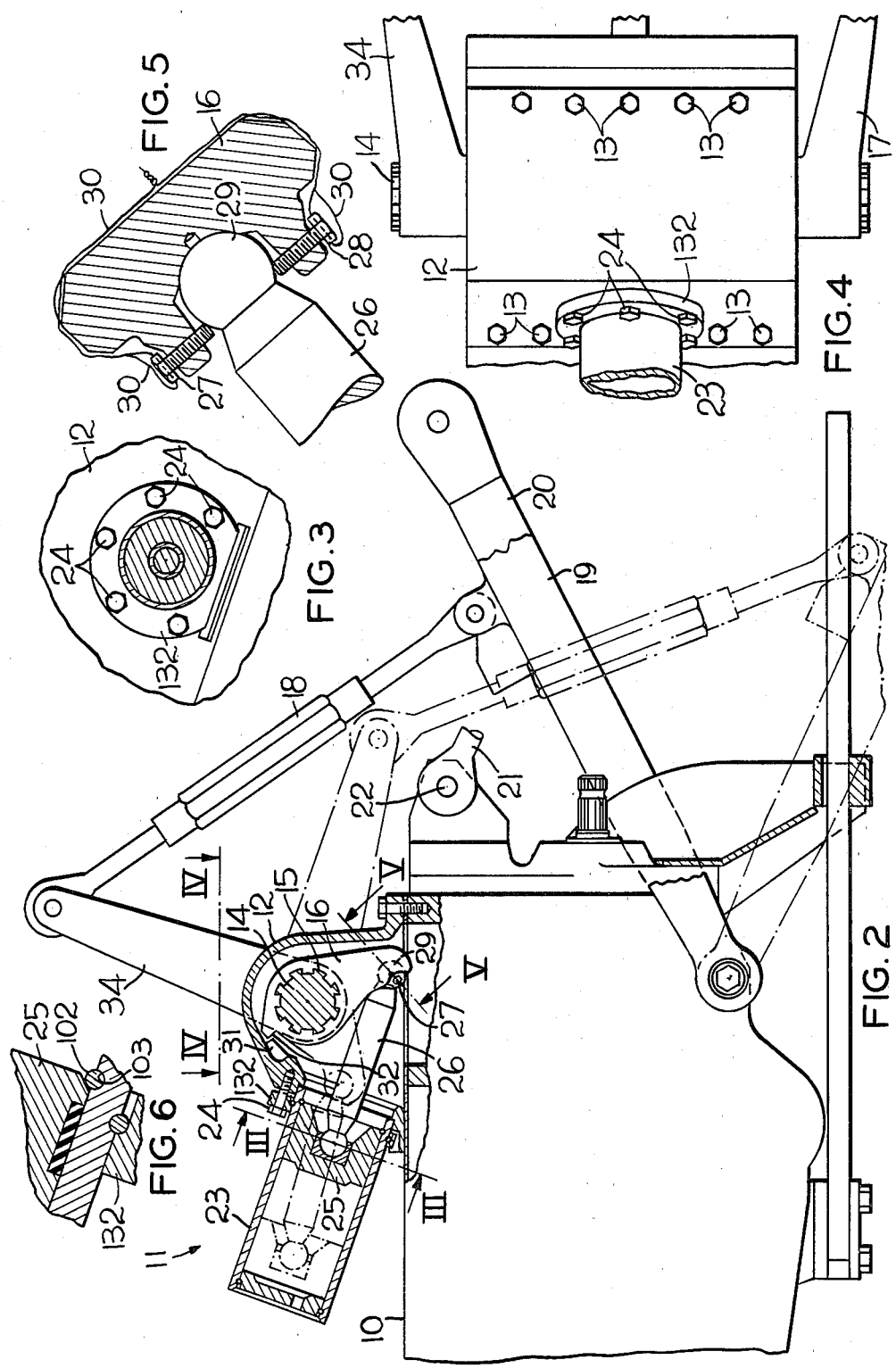

TOP MOUNTED LIFT RAM FOR TRACTOR

This invention relates to a three-point hitch for a tractor and more particularly to a top mounted hydraulic cylinder and rockshaft assembly mounted on the rear drive housing for ease in assembly and servicing.

Conventionally, the three-point hitch is mounted on the rear drive housing with a rockshaft pivotally supported on the outer and upper portion of the housing and the hydraulic ram mounted within the housing. The upper link is pivotally connected to the rear drive housing and the lower links are usually connected through some load sensing device to the lower portion of the rear drive housing.

FIG. 1 of the patent application shows a prior art means of supporting a hydraulic ram and discloses a subassembly within the housing which requires disassembling of the housing and various other components including valves and conduits in order to service the hydraulic ram. Disassembly and servicing the hydraulic ram is a rather cumbersome and time consuming operation.

The forces generated by the lift mechanism creates reaction forces within the housing per se and requires a large rugged housing since the reaction forces are transmitted through the housing during normal operation.

The U.S. Pat. Nos. 3,048,981 Mark et al and reissued 25,415 Mark et al show similar constructions of enclosing a hydraulic ram within the rear drive housing. The applicant's invention has provided for the mounting of the hydraulic ram and rockshaft for lifting of the three-point hitch in a subassembly which mounts on the top of the rear drive housing. The subassembly can be easily assembled or disassembled for servicing and the forces generated in the lift linkage are contained within the hydraulic cylinder and the subassembly of the rockshaft and cylinder per se.

It is an object of this invention to provide a hydraulic cylinder and rockshaft subassembly removably mounted on the rear drive housing.

It is another object of this invention to provide a hydraulic ram for lifting a three-point hitch removably mounted on the outside of the rear drive housing of a tractor to facilitate servicing and repair.

It is a further object of this invention to provide a three-point hitch and rockshaft subassembly pivotally mounted on a rockshaft support casing removably mounted on the rear drive housing with a hydraulic ram removably mounted on the rockshaft casing.

The objects of this inventions are accomplished by mounting a hydraulic cylinder on a rockshaft support casing. The rockshaft carries rockarms for lifting and lowering of three-point hitch during normal operation. The rockshaft casing is fastened to a upper portion of the rear drive housing to facilitate removable of the hydraulic cylinder and rockshaft subassembly as a unit from the rear drive housing. The hydraulic cylinder is also removably mounted from the rockshaft support casing to facilitate testing and servicing of the subassembly.

FIG. 1 illustrates the prior art mounting of a hydraulic cylinder within the rear drive housing.

FIG. 2 is a partially sectioned side elevation view of the three-point hitch mounted on the rear drive housing.

FIG. 3 is a cross-section view taken on line III—III of FIG. 1.

FIG. 4 is a view taken on line IV—IV of FIG. 2.

FIG. 5 is a partial sectional view of the push rod in the hydraulic cylinder.

FIG. 6 is an enlarged view of the end of the piston, cylinder and locking snap ring.

Referring to the drawings, FIG. 1 illustrates the prior art hydraulic ram 1 mounted on the rear drive housing 2. A piston 3 presses against the push rod 4 which operates the actuating arm 5. The actuating arm 5 is connected through a spline 6 to the rockshaft 7. The lift arm 8 is also connected to the rockshaft 7 and connected to the lift link not showing which in turn lifts and lowers the three-point hitch. The reacting forces of the lifting mechanism are transmitted through the rear drive housing 2 at the fastening point on the front end of the hydraulic ram 1 and the actuating arm 5 as it engages the abutment 100 as it reached the end of its stroke thereby placing a strain on the housing and necessating a heavy housing to withstand the loading placed on the housing by the mechanism. The rockshaft 7 is pivotally mounted in the rear drive housing 2 and pivots responsive to the actuation of the hydraulic ram 1 which carries the weight of the linkage suspended on the lift arms 8. Servicing of this hydraulic ram 1 requires removal of the ram from the housing which is an inconvenience and time consuming since accessories and other equipment are mounted on the tractor. According the applicant has provided for a rockshaft and ram subassembly which can be mounted on the top of the rear drive assembly.

Referring the FIGS. 2, 3, 4 and 5, the applicant's invention is illustrated. The rear drive housing 10 supports the rockshaft and hydraulic cylinder subassembly 11. A rockshaft support casing 12 is bolted by a plurality of bolts 13 to the rear drive housing. The rockshaft support casing 12 pivotally supports a rockshaft 14. The rockshaft 14 is connected by mating splines 15 between the actuator arm 16 and between the lift arms 17, 34. Of the two lift arms on the rockshaft 14, the lift arm 34 is connected to lift link 18 as shown. Lift link 18 is connected to the lower draft link 19 and a similar lower draft link 20 is supported by a similar lift link. The lower draft links are pivotally connected to carry the draft load on the rear drive housing 10. The upper link 21 is pivotally connected through the pin 22 to the rear drive housing 10.

The rockshaft support casing 12 is fastened to the upper portion of the rear drive housing 10 to provide a rigid pivotal support for the rockshaft. The hydraulic cylinder 23 is fastened by a plurality of bolts 24 to the rockshaft support casing 12. The hydraulic cylinder 23 receives the piston 25 which reciprocates within the cylinder 23 and operates the push rod 26 in a reciprocating manner to raise and lower the lift arms 17 and 34. A push rod 26 is positioned between the actuator arm 16 and the piston 25 and retained in this position against the weight of the three-point hitch. The bolts 27 and 28 also retain spherical head 29 in the actuator arm 16. The bolts are retained in a nonrotating position by the wire 30 extending through cross openings in the hex head bolts. Piston 101 engages snap ring 102 in recess 103 at the end of the stroke and all forces are contained within the hydraulic cylinder.

The upper and lower positions of the lower draft links 19 and 20 are shown in FIG. 2 and an abutment 31 shown for engaging a shoulder 32 on the actuator arm 16 in the extreme upper position.

The operation of the device will be described in the following paragraphs.

The rockshaft and hydraulic cylinder subassembly 11 are preassembled before assembly on the tractor. The flange 132 of the hydraulic cylinder 23 is bolted by the bolts 24 to the rockshaft support casing 12. In this position, the push rod 26 is positioned between the piston 25 and the actuator arm 16. The end of the push rod 26 is fastened by the bolts 27 and 28 as shown in FIG. 5. The subassembly is then positioned on the rear drive housing 10 and bolted by plurality of bolts 13 as shown in FIG. 4. Once the subassembly is installed, the lift links are connected to the lift arms 17 and 34.

The hydraulic cylinder 23 is operated through a hydraulic system to raise and lower a three-point hitch by pivoting the rockshaft 14 responsive to draft load and the controls at the operator station. The piston 101 engages snap ring 102 at the end of the stroked all reaction forces are retained within the cylinder 23. The subassembly can be removed individually by removing a hydraulic cylinder 23 by means of a plurality of bolts 24 and subsequently the rock shaft support casing 12 by means of the bolts 13. The subassembly can also be removed as a unit which includes the rockshaft and hydraulic actuator if so desired. Prior to installation the subassembly can be tested and then placed on the assembly to assure that the assembly will be in good operating condition when the assembly is made.

The embodiments of the invention in which an exclusive property or privilege is claimed are defined as follows:

1. A top mounted lift ram assembly for a three-point hitch on a tractor comprising, a rockshaft support casing adapted for removably mounting on a rear drive housing, a rockshaft pivotally mounted in said support casing, an actuator arm and lift arms carried on said rockshaft adapted for raising and lowering the three-point hitch, a hydraulic lift ram removably mounted externally on said support casing, a push rod means operatively positioned between said hydraulic lift ram and said actuator arm for pivoting said rockshaft thereby providing a removable assembly of said hydraulic ram and said rockshaft for mounting on said rear drive housing.

2. A top mounted lift ram assembly for a three-point hitch on a tractor as set forth in claim 1 including means for mounting said rockshaft support casing and said hydraulic ram on the top of said rear drive housing.

3. A top mounted lift ram assembly for a three-point hitch on a tractor as set forth in claim 1 including said actuator arm and a pair of lift arms spline connected to said rockshaft and for lifting said three-point hitch.

4. A top mounted lift ram assembly for a three-point hitch on a tractor as set forth in claim 1 including bolts for fastening said hydraulic ram to said rockshaft support casing.

5. A top mounted lift ram assembly for a three-point hitch on a tractor as set forth in claim 1 including means fastening the lower end of said hydraulic ram on said rockshaft support casing.

6. A top mounted lift ram assembly for a three-point hitch on a tractor as set forth in claim 1 including means adapted for connecting said lift arms to lower draft links.

7. A top mounted lift ram assembly for a three-point hitch on a tractor as set forth in claim 1 wherein said rockshaft support casing defines a flat surface adapted for connection to the rear drive housing.

8. A top mounted lift ram assembly for a three-point hitch on a tractor as set forth in claim 1 including means mounting said hydraulic ram on said rockshaft support casing.

9. A top mounted lift ram for a three-point hitch on a tractor as set forth in claim 1 including a piston stop in said hydraulic ram for containing the reaction forces within the lift ram assembly when said hydraulic ram reaches the end of its stroke.

* * * * *